United States Patent [19]

Rosan, Jr. et al.

[11] 4,077,427

[45] Mar. 7, 1978

[54] LEAK DETECTOR VALVE ASSEMBLY

[75] Inventors: Jose Rosan, Jr., Newport Beach; Marvin P. Reece, Dana Point, both of Calif.

[73] Assignee: Rosan Enterprises, Newport Beach, Calif.

[21] Appl. No.: 721,839

[22] Filed: Sep. 9, 1976

[51] Int. Cl.$^2$ .............................................. F16K 37/00
[52] U.S. Cl. ..................... 137/551; 48/193, 116/114P
[58] Field of Search ........... 137/312, 551, 559, 625.28, 137/625.33, 625.35; 48/193; 73/46, 47; 116/114 P, 117 R

[56] References Cited

U.S. PATENT DOCUMENTS 3,583,435   6/1971   Stewart ............................... 73/46 X

FOREIGN PATENT DOCUMENTS 397,721   7/1933   Belgium ............................... 137/551

*Primary Examiner*—Martin P. Schwadron
*Assistant Examiner*—Richard Gerard

[57] ABSTRACT

A valve assembly for detecting leaks in a fluid system which includes an air-tight liquid chamber defined by a transparent sleeve enclosed within a removable cap having windows formed therebetween, the chamber being at least partially filled with liquid, and a plunger means provided with an orifice, including a tube means arranged to communicate between said orifice and liquid within the liquid chamber, wherein the lower end of the tube means is provided with a restraining and sealing means, whereby the upward movement is restricted thereby, and the liquid chamber is sealed during the open mode of the valve. The terminating end of the tube is formed having a beveled tip to allow ease of fluid discharge therefrom. The valve assembly is connected to the fluid line so as to allow the fluid to pass therethrough unimpeded. Depression of the plunger effectively closes the fluid line, except for the passageway afforded by the orifice and the tube, allowing fluid flow to be discharged within the liquid chamber, whereby the existence of a leak in the fluid system is readily observed, through the liquid chamber windows, in the form of escaping fluid bubbles.

6 Claims, 3 Drawing Figures

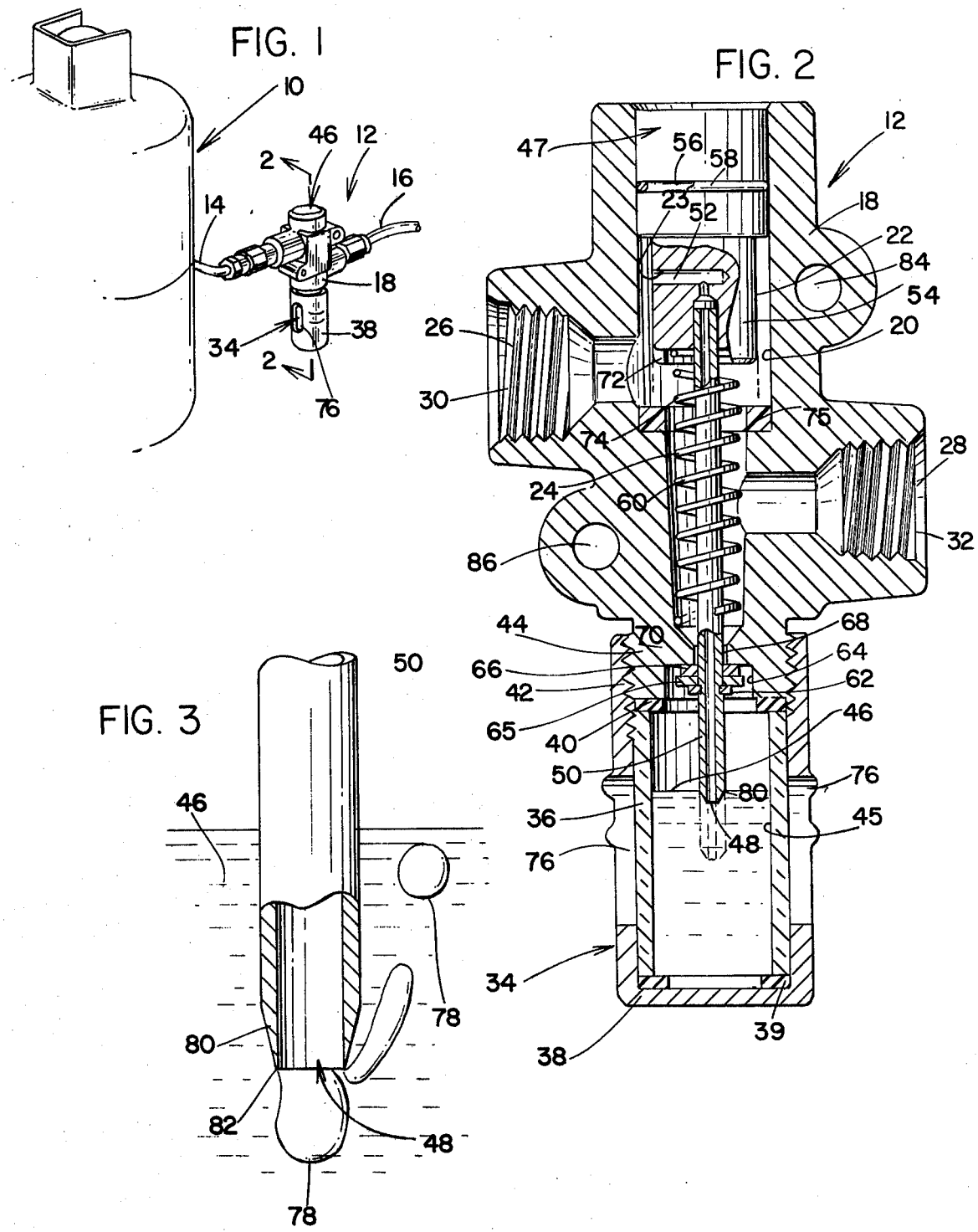

LEAK DETECTOR VALVE ASSEMBLY

BACKGROUND OF THE INVENTION

1. Field of the Invention

This invention relates to leak-detection valves, and more particularly to a leak-detection valve assembly designed for use in recreational vehicles utilizing butane or propane gas systems.

2. Description of the Prior Art

As is well known in the art, various problems and difficulties are encountered in providing a suitable means for indicating gas leaks in gas flow systems, particularly systems employing butane or propane.

With the increased usage of fluid and fluid systems, a simple and inexpensive leak-detection means is not only desirable from the standpoint of economy, but also as sound safety practice. Due to the increased and continuous use of recreational and low-cost housing, particularly with respect to mobile homes, trailers, campers and boats, which utilize butane or propane gas systems, the need for safety devices is in demand because of the increase in potential areas for gas to escape between the gas tank and various appliances attached thereto.

Accordingly, timely detection of gas leaks in the conduits or appliances thereof can prevent hazardous conditions which may result in explosions. Heretofore, however, leak-detection devices for fluid systems have either been nonexistent, complicated or expensive until the introduction of the leak-detector valve as disclosed in U.S. Pat. No. 3,583,435. This particular device eliminated most of the forementioned problems by providing a simple and effective, but inexpensive, device for determining the existence of leaks in a fluid system.

However, the above device of U.S. Pat. No. 3,583,435 has been improved by the disclosure of the instant invention, wherein the patent and present invention have a common assignee.

SUMMARY OF THE INVENTION

The present invention provides a leak-detector valve assembly that comprises a body element with a dual-channeled tubular cavity, wherein one of the channels is interconnected with an inlet opening, the other channel being interconnected with an outlet opening. A plunger means is provided with an orifice that is interconnected to an elongated hollow tube member, the tube member being positioned within the internal chamber communicating with the inlet opening. A transparent bowl means or the like containing liquid therein is secured to the body by a removable cap means having window openings formed therein, so that the tube means carried by the plunger is visually exposed while immersed in the liquid, whereby gas is discharged from the tube means in the form of bubbles to indicate leakage within the gas system.

The device is installed on the downstream side of the pressure regulator between the fluid-supply source, i.e., the butane tank, and the using source, the using source generally being an appliance connected to the tank by conduits, with the plunger in the normally "open" position. Thus, fluid passing from the supply source through the pressure regulator into the inlet opening of the leak-detector valve assembly will pass through both channels of the internal cavity of the body thereof and exit through the outlet opening to the using source. When it is desired to check for leaks in the fluid system or the using source, the using source is turned off so as to avoid drawing fluid from the supply source. Thereafter, the plunger of the leak-detector valve assembly is depressed so as to close the opening between the channels of the internal cavity of the body. As a result, the only passageway available for fluid flow is into the inlet opening of the body, and then through the orifice of the plunger and through the elongated tube means connected to the plunger, the fluid then being discharged into the liquid in the chamber and thereafter exiting through the chamber, which communicates with the outlet opening and passes through the aforesaid outlet opening.

If a leak exits within the fluid system or in any attached appliance thereto, fluid will continue to flow into the leak-detector device, creating noticeable concomitant bubbles in the liquid contained in the transparent bowl means. Conversely, in the absence of a leak in the fluid system or using source, no fluid will flow and no bubbles will be evident in the liquid contained in the bowl means. Thus, an extremely simple and inexpensive leak-detector means is provided.

OBJECTS AND ADVANTAGES OF THE INVENTION

The present invention has for an important object the provision wherein the flow of fluid in the form of bubbles will readily be discharged due to the beveled configuration of the discharge tip of the tube means.

It is another object of the invention to provide a leak-detector valve assembly that includes a simple restraining means to limit the upward movement of the plunger and tube, and establish the necessary opening between the inlet and outlet openings.

It is still another object of the present invention to provide a valve of this character that is simple and relatively inexpensive.

Still another object is to provide a valve of this character that is capable of being installed with simple and conventional tools.

A further important object of the invention is to provide a device of this character that is extremely simple to operate and understand.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

FIG 1 is a pictorial view illustrating the present invention being connected to a gas tank on the downstream side thereto;

FIG. 2 is an enlarged cross-sectional view of the valve assembly taken substantially along line 2—2 of FIG. 1 showing the improvements therein; and FIG. 3 is an enlarged view of the lower end of the tube wherein the discharge tip end is broken away.

DESCRIPTION OF THE PREFERRED EMBODIMENT

Referring more particularly to FIG. 1, there is shown a sealed fluid tank, generally indicated at 10. This type of tank is usually designed to store various types of liquid gases, such as butane or propane, which are used extensively in all types of recreational vehicles, and the low-cost housing field. Interconnected to tank 10 is the leak-detector valve assembly, designated generally by reference numeral 12, the valve being located downstream on the pressure side of the tank, and connected between the tank 10 and using source (that is, an appliance which is not shown) by conduits or flexible pipes 14 and 16. Conduit 14 is attached to the inlet side of said valve, conduit 16 being attached to the outlet side thereof.

Valve assembly 12 comprises a body element 18 having a cavity or bore 20 divided into two internal chambers—an upper, enlarged, internal chamber 22 and a lower, reduced-diameter, internal chamber 24. The upper internal chamber 22 is intersected by an inlet opening or passage 26; and the lower internal chamber 24 is intersected by an outlet opening or chamber 28. The inlet and outlet openings are both provided with conventional threads 30 and 32, respectively, for interconnection in a fluid system, wherein conduit 14 connects to inlet 26 and conduit 16 connects to outlet 28. It is contemplated that a screen or filter means (not shown) may, if desired, be secured across inlet opening 26 between threads 30 and body cavity 20, so as to prevent solid impurities from entering body cavity 20, for reasons which will hereinafter become obvious.

A transparent container means, generally indicated at 34, comprises a transparent sleeve member 36 that is removably sealed within a cap member 38 by a bottom gasket 39 and a top gasket 40. These gaskets prevent liquid and gas from leaking from the threaded connection between cap 38 and body 18. That is, the cap is removably secured to the body by threads 42 and 44, respectively, whereby the cap 38 and the sleeve 36 together define a sealed liquid chamber 45, which is partially filled with liquid 46. The liquid 46 contained in said sealed chamber 45 may be of any kind in which the fluid of the system is not readily soluble. A liquid such as conventional "anti-freeze" is very desirable in that it is easier to detect bubbles created therein, as will hereinafter be more fully described, and does not readily freeze at low temperatures.

A plunger means designated 47 includes a small orifice 48 and an extended hollow tube 50 connected to said orifice through a communicating bleeder passage 52 located in the plunger body 54. Said plunger body 54 is slidable disposed within the upper enlarged chamber 22, the body including an annular groove 56 in which an O-ring 58 is positioned thereon to engage the inner wall of chamber 22, so as to provide a tight leak-proof engagement therebetween.

Biasing means, such as spring 60, is positioned within the lower chamber 24 and extends within the upper chamber 22 to abut against the bottom of plunger 54, so as to maintain plunger 54 in a normally "open" mode of operation (i.e., from being disposed in the juncture of the upper and lower internal chamber 22 and 24, respectively). The maximum axial outward movement of plunger means 47 is limited by a restraining means which comprises a lock ring 62 secured to the depending tube 50, at a point wherein the ring is located within recess 64 of the lower end of the valve body 18. Mounted above and superposed over said lock ring 62 is a washer 65 and gasket 66. The combination of the lock ring and washer and gasket 66 defines a fluid sealing means between the outlet opening 28 and the liquid chamber 45 of the transparent container means 34. That is, while the plunger is in an open mode and fluid is passing through the upper and lower chambers 22 and 24, the liquid chamber is sealed therefrom by gasket 66. Thus, fluid can only pass directly from inlet opening 26 through both internal chambers 22 and 24, and out outlet opening 28 into conduit 16.

Hollow tube 50 axially projects from plunger body 54 so as to extend through the lower internal chamber 24 of body cavity 20 through aperture 68, wherein the discharge end of the tube terminates in the sealed liquid chamber being immersed in liquid 46 contained in cap means 34.

Butane or propane gas systems such as used in mobile homes, trailers, campers, boats, and the like, typically consist of a pressure gas source, that generally being tank 10, having a pressure regulator and a shut-off valve connected to the tank, which is well known and thus not shown. Conduit means (such as 14 and 16) interconnect the pressure regulator and shut-off valve, with the various appliances utilizing the gas—the appliances comprising stoves, lights, etc. In such a system, the leak-detector valve assembly is connected into the fluid system as an integral part thereof between the regulator and shut-off valve, and the using appliances. The leak-detector valve assembly is positioned in the fluid line so that the gas in the system from tank 10 passes through the pressure regulator into inlet opening 26 of valve assembly 12.

Since spring means 60 maintains plunger 54 in a normally "open" position, the gas in the system will flow into the expanded, upper, internal chamber 22 of cavity 20 and into the lower internal chamber 24, whereby the gas will exit via outlet opening 28 through line 16 to the using appliances.

In U.S. Patent 3,583,435, gas was allowed to deviate from its main course and pass through orifice 23 into bleeder passageway 52 through the hollow tube 50 into the liquid 46, or pass from the lower chamber 24 through aperture 68 in the liquid 46, thereby causing bubbles to form in the liquid. However, with the introduction of the restraining means which includes gasket 66, the bubbles created during the "open" mode are now prevented.

Gasket 66 closes aperture 68 by abutting against shoulder 70 of recess 64. Thus, due to the sealing of gasket 66, gas cannot flow through orifice 23 and tube 50, and indicate a false reading of a leak in the system.

However, upon the application of an axial downward force or pressure upon plunger 54, spring means 60 will be compressed and said plunger will be axially depressed until the continuous, annular, protruding lip 72 of the lower end of the plunger body 54 is in tight engagement with the nonmetallic sealing ring 74 positioned about the restricted opening 75 of body cavity 20. Thus, a tight mechanical seal is provided whereby the upper chamber 22 is sealed from the lower chamber 24, whereby the flow of fluid through inlet 26 is prevented from entering the lower chamber 24—except for the passageway provided by orifice 23, bleeder passageway 52 and tube 50.

Thus, it can be seen that, when plunger 54 is depressed, the gasket 66 of the sealing means is moved away from shoulder 70, allowing the lower chamber 24 to communicate with the liquid chamber 45 through open aperture 68.

If, while the leak-detector valve assembly is in a test position, the using appliances are turned off and no leak exists in the fluid system, the fluid pressure on either side of the leak-detector valve assembly 12 would be balanced, without a fluid flow occurring. However, if an appliance is left on or a leak does exists in the fluid system, a fluid flow will exist which—for the reasons hereinabove described—will cause gas to flow into the leak-detector valve assembly via inlet opening 26, through orifice 23 of plunger 54 and through hollow tube 50 into liquid 46, thereby causing a formation of bubbles to the discharged from the discharge end of tube 50. These bubbles are readily visible through window openings 76 provided in cap 38 of the container means 34.

The gas entrapped in bubbles 78, not being soluble in liquid 46, will pass through orifice 23 into the lower chamber 24, so as to exit via outlet opening 48 to the point of the leak or open appliance. Thus, by merely observing the formation of bubbles 78 in liquid 46 while plunger 54 is in the closed test position, the presence of a leak or an open valve in an appliance can be readily detected.

It should be noted that some leaks within the fluid system are sometimes very small and the gas flow is slight. To prevent bubbles from hanging up at the discharge end of tube 50, the discharged end is beveled at 80, as seen in FIG. 3. Thus, an annular knife edge 82 is formed, whereby the discharging bubbles can freely flow therefrom.

Upon the release of the axial pressure in plunger 54, spring means 60 will return plunger 54 to its normally "open" position, thereby releasing the seal provided by the tight contact between the annular lip 72 and nonmetallic sealing ring 74, at which time gasket 66 is brought into sealing contact with shoulder 70 of recess 64, closing communication between lower chamber 24 and liquid chamber 45 so as to again allow the fluid in the system to flow relatively unimpeded through valve 12.

To facilitate the installation of the leak-detector valve assembly in a fluid system, securing means comprised of screw or bolt holes 84 and 86 are provided. The length of holes 84 and 86 is such that they are co-extensive with the thickness of the valve body 18.

While one embodiment of the invention has been described it is, of course, understood that the particular embodiment of the invention herein disclosed is for illustrative purposes only.

We claim:

1. A fluid leak detector valve assembly having a body providing an internal cavity defined by an upper internal chamber and a lower internal chamber, the upper chamber having an inlet port and the lower chamber having an outlet port;
    container means containing liquid means attached to the body, the space above the liquid means communicating with the lower internal chamber and the outlet port;
    said inlet and outlet ports being interconnected through said upper and lower internal chambers;
    a normally open plunger means positioned in said upper chamber and being axially displaceable within said upper chamber so that in the closed or test position it substantially closes to fluid communication said body between said inlet and outlet ports;
    said plunger means being provided with bleeder means and an elongated tubular means interconnected therewith for conducting fluid through said plunger means in the closed or test position;
    an end of said tubular means being below the surface of the liquid in the test or closed position so that the passage of gaseous fluids will create bubbles in said liquid;
    means engaging said plunger means for returning said plunger means to a normally open position providing for flow communication between said ports; and
    wherein the improvement thereof comprises;
    a sealing means connected to said tubular means for slideable displacement therewith, whereby said lower internal chamber is sealed from said container means when said plunger means is in a normally open position; and
    a beveled end on the end of the tubular means that is submerged in the liquid, such beveled end culminating in an annular knife edge.

2. A leak detector valve assembly as described in claim 1, wherein said plunger means is provided with a means for restraining the axial displacement of said plunger means relative to the body, said restraining means being secured to said tubular means below said lower internal chamber.

3. A leak detector valve assembly as described in claim 2, wherein said valve body includes a recess having a shoulder formed below said lower internal chamber, said shoulder adapted to engage said restraining means and said sealing means.

4. A leak detector valve assembly as recited in claim 3, wherein said lower chamber is provided with an aperture adjacent said recess, and wherein said sealing means comprises a lock ring removably secured to said tubular means; a support washer superimposed over said lock ring and a gasket seal mounted to said support washer for direct engagement with said shoulder of said recess, whereby said aperture is closed when said plunger means is in a normally open position, and wherein said gasket is displaced therefrom when said plunger means is in a closed or test position whereby said outlet part communicates with said container means.

5. A leak detector valve assembly as recited in claim 4, wherein said restraining means comprises said lock ring secured to said tubular means, said support washer superimposed over said lock ring and said gasket mounted to said support washer whereby upward axial displacement of said plunger means is prevented thereby by the seating of the gasket against the shoulder means in the normally open position.

6. A leak detector valve assembly as recited in claim 5, wherein said container means comprises a cap removably mounted to said body having a window opening formed therein and a transparent sleeve member disposed within said cap wherein said cap and said sleeve define a liquid chamber wherein said liquid is stored therein.

* * * * *